Figure 1:
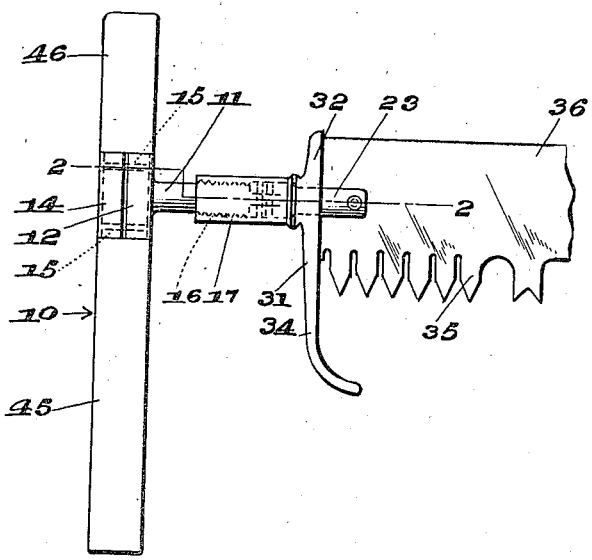

Sept. 23, 1941.          H. L. HARDISTY          2,256,842
                     HANDLE FOR CROSSCUT SAWS
                        Filed Aug. 14, 1940

Inventor
Henry L. Hardisty
By
Nunn, Anderson & Liddy
Attorney

Patented Sept. 23, 1941

2,256,842

UNITED STATES PATENT OFFICE 2,256,842

HANDLE FOR CROSSCUT SAWS

Henry L. Hardisty, Portland, Oreg.

Application August 14, 1940, Serial No. 352,614

3 Claims. (Cl. 145—111)

This invention relates to handles for cross-cut saws.

An object of the invention is the provision of a handle which may be readily and conveniently secured to a cross cut saw and which may be readily removed as desired.

Another object of the invention is the provision of a handle which may be readily applied to a cross cut saw and tightened without danger of becoming disassembled during the operation of the saw and which is simple and efficient.

This invention will be best understood from a consideration of the following detailed description, in view of the accompanying drawing forming a part of the specification; nevertheless, it is to be understood that the invention is not confined to the disclosure, being susceptible of such changes and modifications, as define no material departure from the salient features of the invention as expressed in the appended claims.

Figure 2:
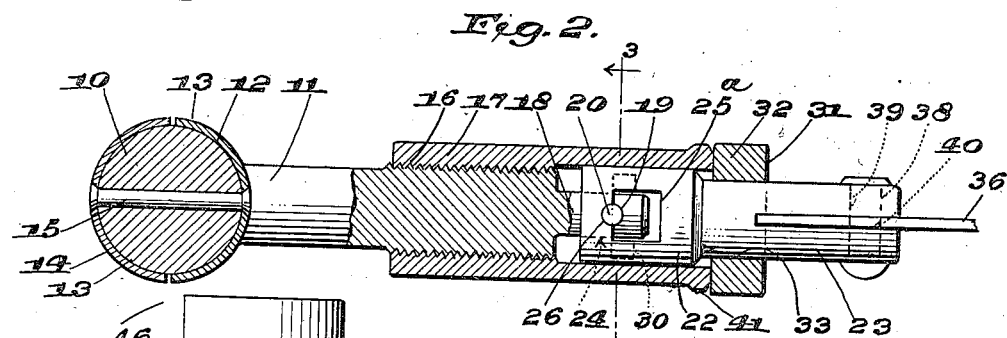
Figure 3:
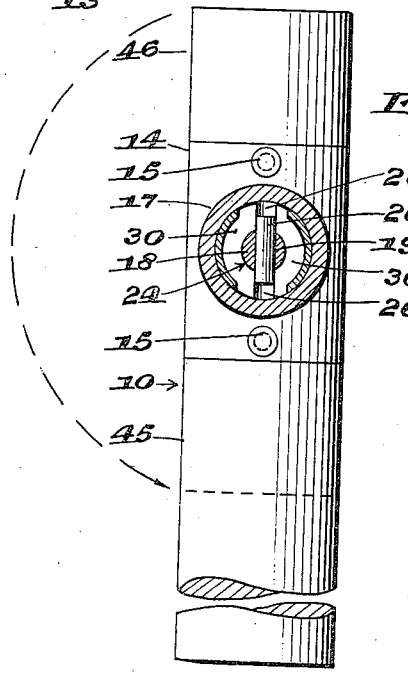
Figure 4:
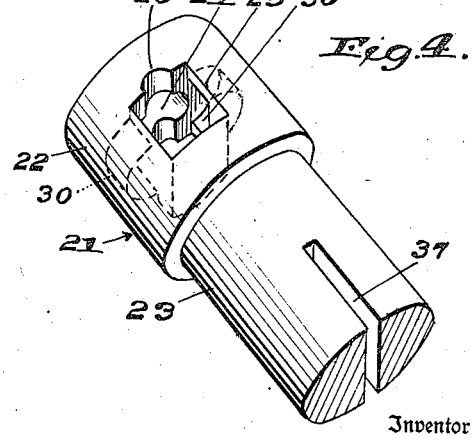

In the drawing:

Figure 1 is a side view in elevation of the handle shown applied to a cross cut saw, Figure 2 is a horizontal section taken along the line 2—2 of Figure 1, Figure 3 is a transverse vertical section taken along the line 3—3 of Figure 2, and Figure 4 is a view in perspective of a connecting means forming one of the elements of the handle.

Referring more particularly to the drawing, 10 designates a handle which is cylindrical in form but which may be of any suitable configuration. A shank 11 is provided with a U-shaped flange designated by the numeral 12. This U-shaped flange which is in the form of a pair of wings 13 extending outwardly from the shank 11 in a semi-circle. A U-shaped plate, generally designated by the numeral 14, forms with the wings 13 a substantially circular sleeve which receives the handle 10. A rivet 15 is located above and below a horizontal plane passing through the shank 10 and these rivets pass through perforations in the plate 14, the handle 10 and the flange 12 for securing said plate and the handle to the shank. The curved plate 14 and the flange 12 are countersunk into the handle so that all of these members present a smooth and continuous surface to the hands of the operator.

The inner end of the shank is threaded, as shown at 16 to receive the internal threads of a sleeve 17.

The shank at its extreme and inner end and beyond the threads 16 is reduced, as shown at 18. The reduced portion is provided with a diametrical passage 19 to receive a pin 20.

A connecting member 21 has an enlarged portion 22 and a reduced portion 23. The enlarged portion is provided with an axial passage 24 to receive the reduced end 18 of the shank 11. The enlarged portion also has a diametrical passage 25 which is rectangular in cross section and a groove 26 which receives the pin 20 and which opens into the passage 25 and the passage 24.

Referring more particularly to Fig. 3 it will be seen that the enlarged portion 22 has a pair of arcuately-shaped grooves 30 in line with the pin 20. This pin is shorter than the length of the groove 26 so that the pin may be rotated through an angle of 180° within the enlargement 22 with the outer ends of the pin moving in close association with the inner walls of the grooves 30 for a purpose which will be presently explained.

A guard 31 has an enlarged thickened portion 32 in which a passage 33 is formed to receive the reduced portion 23 of the connecting member 21. The guard has a depending portion 34 which extends downwardly and around the teeth 35 of a cross cut saw blade 36.

The inner end of the blade is received within a slot 37 of the reduced portion 23 of the connecting member 21. A rivet or bolt 38 is received by a diametrical passage 39 and the reduced portion 23 of the member 21 and also by a passage 40 in the blade 36 whereby the blade is secured in position.

The sleeve 17 is provided with a wrench gripping portion 41 for rotating the sleeve inwardly to loosen the same or for moving the said sleeve tight against the enlarged portion 32 of the guard 31.

The construction just described provides not only for an efficient means for connecting the blade 36 to the handle 10 but also provides means for reversing the position of the handle from that shown in Fig. 1 to a diametrically opposite position so that the long portion 45 of the handle may be moved to the position where the short portion 46 of the handle is located. By reversing the position of the handle the operator will grip that portion of the handle above the plane of the shank 11 instead of below. By changing the position of the handle the operator of the saw may continue working a long while without becoming tired.

When it is desired to move the handle 10 from the position in Fig. 1 to a diametrically opposite position, the sleeve 17 is loosened and moved backward sufficiently to permit the shank and likewise the sleeve to be moved forwardly so that the reduced end 18 of the shank may be moved to engagement with the outer wall 25a of the diametrical passage 25. When this happens the pin 20 will be moved out of the groove 26 whence the handle 10, the shank 11 and the sleeve 17 may be revolved through 180° so that the long portion 45 of the handle 10 will be moved to the upper position. The sleeve 17 is then revolved until the outer end of the sleeve again tightly abuts the enlargement 32 of the guard 31 whence the handle will be locked in place.

When the handle is rotated through the 180° just described, the pin 20 will be revolved through the arcuately-shaped groove 30 in the member 22 with the free end of the pin just clear of the inner walls of said groove.

It will be seen by this construction that the handle 10 may be readily reversed in position by the loosening of the sleeve 17 to cause the sleeve to be withdrawn from its contact with the guard 31, whereby the handle 10 may be revolved after which the sleeve is then drawn up tight.

I claim:

1. A reversible cross-cut saw handle comprising a shank having one end threaded, a hand grip secured to the other end of the shank, said shank, outwardly of the threaded portion having a reduced portion, a connecting member having a diametrical passage, a groove in the outer end of the passage, an axial passage at one end leading into the diametrical passage, the reduced end of the shank received by the axial passage and provided with a transverse opening which is adapted to aline with the groove, a pin in the opening and the groove, said pin being of less length than the width of the connecting member, the connecting member having diametrically disposed arcuate slots through which the ends of the pin are adapted to be moved when the shank is revolved through 180 degrees, means securing the other end of the connecting member to a saw blade, a shoulder on said connecting member, a guard on the connecting member between the blade and the shoulder, and a sleeve screwed onto the threaded portion of the shank and having one end tightly engaging the guard for causing the pin to be pressed into the groove, loosening of the sleeve permitting the pin to be moved out of the groove so that the handle and shank may be revolved to reverse the handle.

2. A reversible cross-cut saw handle comprising a shank, a hand grip secured to the other end of the shank, said shank having a reduced portion, a connecting member having an axial passage at one end, a transverse pin seat at the inner end of the axial passage, the reduced end of the shank received by the axial passage and provided with a transverse opening which is adapted to align with the seat, a pin in the opening and the seat, said pin being of less length than the width of the connecting member, the connecting member having diametrically disposed arcuate slots through which the ends of the pin are adapted to be moved when the shank is revolved through 180 degrees, means securing the other end of the connecting member, a guard on the connecting member between the blade and the shoulder, a sleeve on the inner end of the shank, housing the adjacent end of the connecting member and having one end engaging the guard, and cooperating means between the sleeve and said shank for removably connecting the sleeve to the shank and for maintaining the sleeve tight against the guard and for loosening the sleeve permitting a reversal of the handle.

3. A cross-cut saw handle comprising a shank having one end threaded, a hand grip secured to the other end of the shank, said shank outwardly of the threaded portion having a reduced portion, a connecting member having a transverse seat for a pin and an axial passage at one end leading onto the seat, the reduced end of the shank received by the axial passage and provided with a transverse opening which is adapted to align with the seat, a pin in the opening and received by the seat, said pin being of less length than the width of the connecting member, the connecting member having diametrically disposed arcuately shaped slots through which the ends of the pin are adapted to be moved when the shank is revolved through 180 degrees, means securing the other end of the connecting member to a saw blade, a shoulder on the connecting member, and a sleeve screwed onto the threaded portion of the shank and having one end abutting the shoulder, said sleeve when screwed against the shoulder tending to force the connecting member away from the shank so that the pin will be rigidly held between the seat in the connecting member and the walls of the opening in the reduced end of the shank.

HENRY L. HARDISTY.